United States Patent
Robinson

(10) Patent No.: US 7,395,373 B2
(45) Date of Patent: Jul. 1, 2008

(54) SET-ASSOCIATIVE CACHE USING CACHE LINE DECAY COUNTS AND SET OVERFLOW

(75) Inventor: John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/230,866

(22) Filed: Sep. 20, 2005

(65) Prior Publication Data

US 2007/0233964 A1     Oct. 4, 2007

(51) Int. Cl.
G06F 12/00     (2006.01)
(52) U.S. Cl. .................. 711/133; 711/128; 711/134; 711/136; 711/144; 711/202
(58) Field of Classification Search .................. None
See application file for complete search history.

(56) References Cited

U.S. PATENT DOCUMENTS

| | | | |
|---|---|---|---|
| 5,465,342 A | 11/1995 | Walsh | |
| 5,860,095 A | 1/1999 | Iacobovici et al. | |
| 5,978,888 A | 11/1999 | Arimilli et al. | |
| 6,026,470 A | 2/2000 | Arimilli et al. | |
| 6,098,152 A | 8/2000 | Mounes-Toussi | |
| 6,510,493 B1 | 1/2003 | Liu et al. | |
| 6,578,111 B1 * | 6/2003 | Damron et al. | 711/133 |
| 6,732,238 B1 | 5/2004 | Evans et al. | |
| 6,823,427 B1 | 11/2004 | Sander et al. | |
| 2004/0083341 A1 | 4/2004 | Robinson et al. | |
| 2005/0055511 A1 | 3/2005 | Schreter | |
| 2005/0108480 A1 | 5/2005 | Correale, Jr. et al. | |

OTHER PUBLICATIONS

Kaxiras, et al., "Cache Decay: Exploiting Generational Behavior to Reduce Cache Leakage Power," 12 pages, Jul. 2001.
Qureshi, et al., "The V-Way Cache: Demand Based Associativity via Global Replacement," High Performance Systems Group, TR-HPS-2004-003, Oct. 2004, pp. 1-22.

* cited by examiner

*Primary Examiner*—Reginald G. Bragdon
*Assistant Examiner*—Shawn X Gu
(74) *Attorney, Agent, or Firm*—Gibb & Rahman, LLC; Eustus D. Nelson, Esq.

(57) ABSTRACT

Embodiments of a method for reducing conflict misses in a set-associative cache by mapping each memory address to a primary set and at least one overflow set are described. If a conflict miss occurs within the primary set, a cache line from the primary set is selected for replacement. However, rather than removing the selected cache line from the cache completely, the selected cache line may instead be relocated to the overflow set. The selected cache line replaces a cache line in the overflow set, if it is determined that the selected cache line from the primary set has an estimated age that is more recent than an estimated age for any cache line in the overflow set. Embodiments of the method incorporate various techniques for estimating the age of cache lines, and, particularly, for estimating the relative time since any given cache line was last accessed.

20 Claims, 6 Drawing Sheets

SET-ASSOCIATIVE CACHE USING CACHE LINE DECAY COUNTS AND SET OVERFLOW

STATEMENT OF GOVERNMENT INTEREST

The invention was made with Government support under Contract No.: NBCH3039004 awarded by DARPA PERCS II. The Government has certain rights in this invention.

BACKGROUND OF THE INVENTION

1. Field of the Invention

The invention relates to a set-associative cache memory system and, more particularly, to a set-associative cache memory system in which each memory address is mapped to both a primary set and at least one other set.

2. Description of the Related Art

Most computer processing systems generally consist of several levels of memory, including at least one relatively small capacity high speed memory storage mechanism referred to as a cache memory. The cache memory may be located in either a section of the main memory or a separate memory storage device. There are several types of cache organization: direct-mapped, associative and set-associative. Direct-mapped caches are characterized by a one-to-one mapping from system address to cache address. Associative-mapped caches are characterized by mapping from any system address to any cache address. Set-associative caches are characterized by a one-to-many mapping from system address to a set address, but not to a particular line within the set. For example, in a four-way set-associative cache, the data corresponding to the system can be found in one of four lines in a set within the cache. There is a direct mapping from system address to set address. However, a tag (e.g., a subset of the upper system address bits) must be compared (e.g., by a comparator) with the tags for each of the four lines of the set to determine which line contains the data.

Some of the main determining factors in computer system processor performance are cache hit ratios. Specifically, it is desirable to obtain as high a cache hit ratio as possible subject to constraints such as minimal access latency and chip area. Cache misses can be categorized as conflict misses, capacity misses, and coherency misses. Conflict misses are an effect arising from set-associative cache designs, in which cache accesses from one process or thread by chance happen to map to the same set as other cache accesses from the same or other processes or threads, causing an excessive number of misses to that set. Typically, there are a number of "hot" sets, which dominate the overall number of cache misses. Here, a "hot" set is used as a generic term to refer to one of the sets in a set-associative cache for which there is an excessive number of conflict misses as compared to a typical set.

Various methods and systems for reducing conflict misses in set-associative cache memories are known. One method is to increase the associativity of the set-associative cache, and in fact there is a trend in recent computer system designs for increased associativity for the system caches. However, there are limits to which associativity can be increased in set-associative cache design. For example, in order to access the cache directory in a K-way associative cache, K tags are simultaneously read from K tag directories and simultaneously compared using K comparators to the tag of the address being accessed. As K increases, there is an increase in power requirements and power density. Additionally, the degree to which K can be increased is limited by wiring area, chip area, and timing constraints.

Another method, disclosed in U.S. Pat. No. 5,465,342, to Stephen J. Walsh, issued Nov. 7, 1995, for "Dynamically Adaptive Set Associativity for Cache Memories" (incorporated herein by reference), incorporates the use of "micro-caches" that are dynamically assigned to sets that are identified as hot. There are a number of disadvantages to this and other conceptually similar approaches. Primarily, they require additional hardware complexity for counting misses for each set and for selecting those sets that have excessive miss counts as compared to typical sets.

Another method, disclosed in "The V-Way Cache: Demand Based Associativity via Global Replacement" by Qureshi, Thompson, and Pratt, University of Texas at Austin technical report TR-HPS-2004-003, October, 2004 (incorporated herein by reference), provides a system that reduces conflict misses by using a cache directory containing twice as many entries as the number of cache lines holding data. However, such a cache directory introduces extra chip area cost. A level of indirection is also introduced between the cache directory entries and cache lines via forward and reverse pointers, which may cause additional latency for every cache access.

Therefore, it would be advantageous to provide a set-associative cache memory with reduced conflict misses without increasing the associativity of the cache, without increasing the number of entries in the cache directory, without introducing levels of indirection between the cache directory and the cache, and without introducing additional latency for the most frequently accessed cache data. Specifically, it would be advantageous to provide a method that addresses the issue of conflict misses in set-associative cache memory by mapping a primary set address and at least one overflow (secondary) set address, by selecting a least recently used (LRU) line from within a set if a conflict miss occurs, by sending the selected line to an overflow set, and by replacing a line in the overflow set with the selected line, if the selected line is more recent.

SUMMARY OF THE INVENTION

In view of the foregoing embodiments of the invention provide a computer-implemented method for reducing conflict misses in a set-associative cache by mapping each memory address to a primary set within the cache and one or more overflow sets within the cache. If a conflict miss occurs within the primary set, a cache line from the primary set is selected for replacement. However, rather than removing the selected cache line from the cache completely, the selected cache line may instead be relocated to the overflow set mapped for the particular memory address. The selected cache line replaces a cache line in the overflow set, if it is determined that the selected cache line from the primary set has an estimated age that is more recent than an estimated age for any cache line in the overflow set. For example, the selected cache line will replace the least recently used cache line in the overflow set, if that least recently used line is older.

More particularly, embodiments of the invention provide a computer-implemented method for reducing conflict misses within a set-associative cache of a computer system. The method includes an initialization process. During the initialization processes, logical fields are established for each set, comprising a plurality of lines, in a cache directory within the set associative memory. For each line in the set, the logical fields can include but are not limited to, corresponding valid bits, age bits, tags, and state bits. For each set, the logical fields can also include, but are not limited to: a first-type flag to indicate that a line from this set has been relocated to an overflow set; a second-type flag to indicate that a line from another set has overflowed into (i.e., been relocated into) this set; an optional first set index to identify a set number to which a line from this set has been relocated; and an optional second set index to identify a set number from which a line overflowed into this set.

The age bits can be used to register the age of each line within a set (e.g., the age bits can be used to register a relative length of time since the line was last accessed). For example, all age bits for a particular line can be reset to "0", when that line is accessed. Then, the age bits can be incremented over time by associating a decay counter with each cache line in the set-associative memory to register the estimated age that cache line. Alternatively, each line can have the same number of multiple age bits (e.g., a first age bit, a second age bit and a third age bit). Each of the age bits can be associated with a corresponding counter. For example, each first age bit can be associated with a first counter, each second age bit with a second counter, etc. Each counter can be in communication with a clock signal. Then, the age bits (e.g., first, second, and third age bits) for each line can be incremented at different rates based upon communications to the corresponding counters from a clock signal. For example, frequency dividers can be positioned between each counter and a single clock signal to vary the rates at which a clock signal is received by each counter. As each counter is incremented its corresponding age bits for the different lines are set.

Also, during the initialization processes, each memory address (e.g., of a main memory of the computer system) is mapped to a primary set (e.g., a first set) and at least one overflow set (e.g., a second set). This mapping can be implemented using a variety of techniques. For example, each memory address can be mapped to a second address of the second set within the set-associative memory as a function of a first address of the first set (e.g., the over flow set number O(s) can be (S+nsets/2+offset) MOD nsets, where S is the primary set number, nsets is the total number of sets, and the offset is a predetermined constant value. Alternatively, the memory address can be mapped to the second address of the second set by applying a bit-inverting technique, where the set-associative memory comprises n-sets and each of the n-sets is addressed by n-bits, and where a notation (e.g., !x) is used to indicate inverting a value of a given bit (e.g., bit x) within given set.

Once the logical fields are established and the memory addresses are mapped, then if conflict misses occur in a first set, replaced lines can be relocated to the mapped second set instead of being lost (i.e., removed from the set-associative cache). Thus, if data is input into a cache line of a set and a conflict miss occurs, then a cache line (i.e., a selected cache line) within the set is selected for replacement based on predetermined replacement policies. These replacement policies can include, but are not limited to, selecting the least recently used (LRU) line based upon a comparison of the age bits of each line within the set.

Generally, if a conflict miss occurs, a determination can be made as to whether the selected cache line is an original line (i.e., received directly from another memory within the computer) or an overflow line (i.e., relocated to the first set from another set within the set-associative cache). If the selected cache line is an original line or if multiple overflow sets are mapped, the selected cache line can be forwarded to the appropriate overflow set (e.g., the second set). Then, the age bits of the selected cache line from the first set can be compared to the age bits of each line in the second set and a determination can also be made as to which of the cache lines from the second set was least recently accessed. If the selected cache line from the first set is estimated to be newer (e.g., estimated to be more recently accessed) than any one of the cache lines in the second set, the selected cache line will replace the oldest (e.g., estimated to be least recently accessed) cache line of the second set. Once such an overflow replacement has occurred, the second set will be flagged (e.g, with a second-type flag) to indicate that it contains a cache line received as overflow from another set. Additionally, the first set will be flagged (e.g., with a first-type flag) to indicate that a cache line was relocated from the first set to another set. However, if the selected cache line is already an overflow line and only one second set (i.e., overflow set) has been addressed, a determination will be made as to whether the first set currently contains any other overflow lines and, if not, a second-type flag will be cleared from the first set.

To access a cache line (e.g., the selected cache line) from the set-associative memory, an initial determination is made as to whether the first set is flagged with a first-type flag to indicate that a cache line has been relocated from the first set to another set. If there is no first flag, then the cache directory is simply accessed to locate the selected cache line. If the first set is flagged with a first-type flag, then the cache directory is accessed a first time to determine if the selected cache line is still located in the first set (e.g., if the selected cache line or a different cache line was previously relocated). If the selected cache line is not located in the first set, a determination is made as to whether the second set is still flagged with a second-type flag indicating that it contains a cache that was relocated to the second set from another set. If the second set has a second-type flag, the cache directory is accessed a second time to determine if the selected cache line is still located in the second set. Alternatively, if the first set is flagged, the cache directory can be accessed and a determination can simultaneously be made as to whether the selected cache line is located in either the first directory or the second directory.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
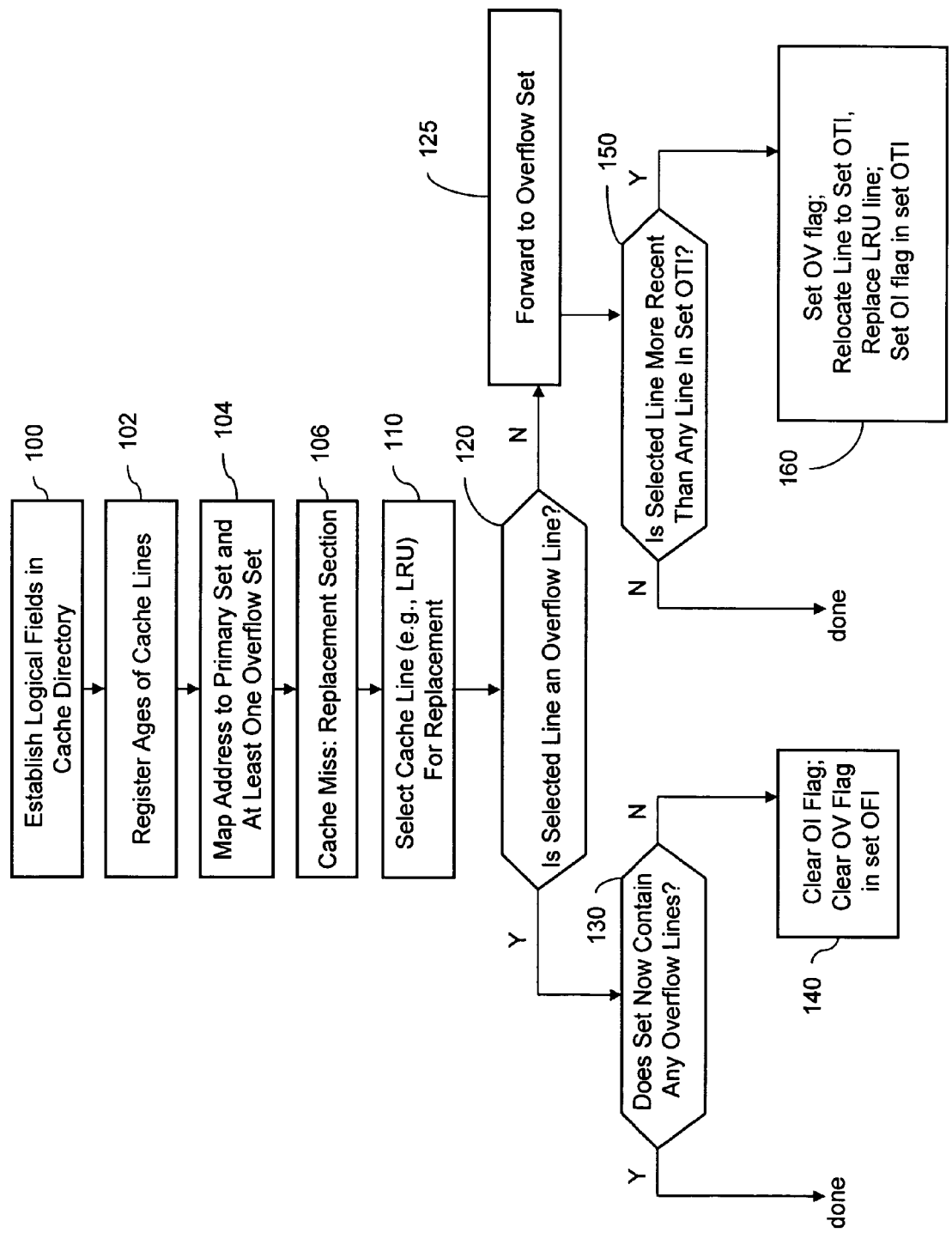
FIG. 1 is a schematic flow diagram illustrating an embodiment of the method.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

In view of the foregoing, disclosed herein are embodiments of a method that addresses the issue of conflict misses in set-associative cache memory by mapping a primary set address and at least one overflow (secondary) set address, by selecting a least recently used (LRU) line from within a set if a conflict miss occurs, by sending the selected line to an overflow set, and by replacing a line in the overflow set with the selected line, if the selected line is more recent. Specifically, disclosed is a method for reducing conflict misses in a set-associative cache by mapping each memory address to a primary set within the cache and one or more overflow sets within the cache. If a conflict miss occurs within the primary set, a cache line from the primary set is selected for replacement. However, rather than removing the selected cache line from the cache completely, the selected cache line may instead be relocated to the overflow set mapped for the particular memory address. The selected cache line replaces a cache line in the overflow set, if it is determined that the selected cache line from the primary set has an estimated age that is more recent than an estimated age for any cache line in the overflow set. Additionally, the various embodiments of the method incorporate different techniques for estimating the age of cache lines, and, particularly, for estimating the relative time since any given cache line was last accessed. Each of the below described embodiments of the method reduce conflict misses in a set-associative cache without increasing the associativity of the cache, without increasing the number of entries in the cache directory, and without introducing levels of indirection between the cache directory and the cache.

More particularly, referring to the flow diagram of FIG. 1, embodiments of the method of the invention for reducing conflict misses within a set-associative cache of a computer system comprise an initialization process during which a cache directory for the set-associative cache is established. Specifically, logical fields 290 for each set 200 within a cache directory (process 100, see FIG. 2) are established. For each line 201-204 within the set 200, the logical fields 290 can include, but are not limited to, corresponding valid bits 250, age bits 260, tags 270, and state bits 280. The state bits 280 may, for example, contain bits representing line states such as, modified, exclusive, shared, etc. The age bits 280 can be used to register the age of each line w/in a set (e.g., the age bits can be used to register a relative length of time since the line was last accessed) (process 102). When a line is accessed, all age bits 280 for the particular line can be reset to "0". Then, the age bits 280 for each line can be incremented over time so that they can be compared to age bits of other lines in order to estimate the most recently accessed or least recently accessed lines.

Additionally, for each set 200, the logical fields 290 can also include, but are not limited to: a first-type flag 210 (e.g., OV flag) to indicate that at least one line 201-204 from this set 200 has been relocated to an overflow set; a second-type flag 220 (e.g., OI flag) to indicate that a cache line from another set has overflowed into (i.e., been relocated into) and is still contained within this set 200; an optional first set index 230 (e.g., OTI index) to identify a set number to which a line from this set 200 has been relocated; and an optional second set index 240 (e.g., OFI) to identify a set number from which a line has overflowed into this set. The exemplary logic fields 290 (described above and illustrated in FIG. 2) represent an approach to the method in which any possible primary to overflow set mapping can be configured at system initialization time (see discussion below regarding address mapping). It should be noted that the optional OTI 230 and OFI 240 fields may be read-only fields, or they may be writeable fields which are set at system initialization. In the latter case any possible primary to overflow set mapping may be utilized by setting these two fields for every set appropriately. Alternatively, if the primary to overflow set mapping is computed by hardware-based functional units, then these fields may be omitted from the logical structure of the cache directory.

Those skilled in the art will recognize that to register the age of each line at process 102 of FIG. 1, a number of alternative methods may be implemented. For example, decay counters could be used rather than age bits to provide estimates of cache line age. More specifically, the age bits can be incremented by associating a decay counter with each cache line in the set-associative memory to register the estimated age of each cache line. A similar technique was recently proposed for power reduction in cache design by means of the use of power-gating so as to reduce leakage power for "old" cache lines, that is, cache lines for which an estimated cache line age has exceeded a threshold (e.g., see "Cache Decay: Exploiting Generational Behavior to Reduce Cache Leakage Power", by Kaxiras, Hu, and Martonosi, published in the Proceedings of the 28th Annual International Symposium on Computer Architecture (ISCA), 2001 (incorporated herein by reference). However, decay counters, which are in essence small registers, may represent a non-trivial increase in the hardware complexity of the cache.

Figure 3:
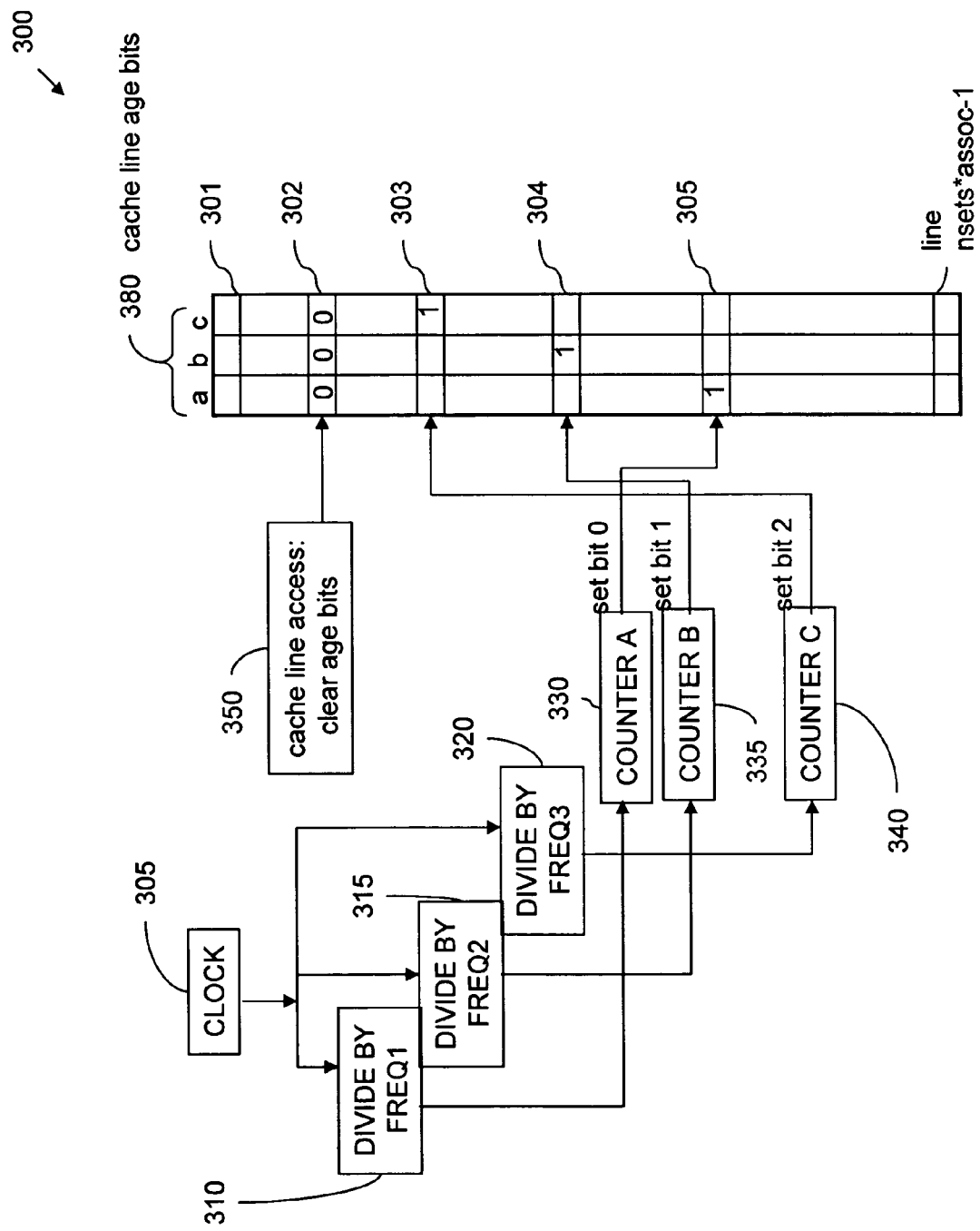

Alternatively, the age bits in the cache directory could be used in a fashion similar to decay counters, in which the age bits are interpreted as a counter. In this case cache line aging would involve cyclically reading the age bits, incrementing this value, and then writing it back. More specifically, to register the age of each line at process 102 of FIG. 1, each cache line (e.g., 301-305, etc.) can have the same number of multiple age bits (e.g., three age bits 380 as illustrated, a first age bit 380a, a second age bit 380c and a third age bit 380c, see FIG. 3). Each of the age bits 380a-c can be associated with a corresponding counter. For example, each first age bit 380a can be associated with a first counter 320, each second age bit 380b with a second counter 335, and each third age bit 380c with a third counter 340. Each counter 330, 335, 340 can be in communication with a clock signal 305. Then, the age bits (e.g., first, second, and third age bits 380a-c) for each line 3011-305 can be incremented at different rates based upon communications to the corresponding counters 330, 335, 340 from the clock signal 305. For example, frequency dividers 310, 315, 320 can be positioned between corresponding counters 330, 335, 340, respectively, and a single clock signal 305 to vary the rates at which a clock signal is received by each counter. As each counter 330, 335, 340 is incremented, its corresponding age bits 380a-c for the different lines are set. More particularly, the clock signal 305 can be reduced in frequency by the three dividers 310, 315, and 320. Each successive divider reduces the clock frequency 305 by a greater amount (e.g., FREQ1, FREQ 2, FREQ3, etc.). For example, the divisor value (FREQ1) of divider 310 could be 16, the divisor value (FREQ2) of divider 315 could be 32, and the divisor value (FREQ3) of divider 330 could be 64. The divided clock signals passed to the counters 330, 335, 340 from dividers 410, 415, and 420 are used to control incrementing of the three counters 330, 335, 340. Additionally, each counter 330, 335, 340 can be configured to reset to 0 when it exceeds the number of cache lines in the cache. For example, if the number of cache lines is a power of 2 such as 1024, this is achieved trivially by implementing the counter with log base 2 of the number of cache lines, that is 10 bits (for example) if there were 1024 cache lines. On each counter increment, an age bit is set for the cache line in the cache directory as determined by the counter value: age bit 0 for the cache line with an index as determined by COUNTER A 330, age bit 1 for the cache line with an index as determined by COUNTER B 335, and age bit 2 for the cache line with an index as determined by COUNTER C 340. When a cache line is accessed, all age bits are reset to zero (see line 302). In this fashion the age bits 380*a-c* provide an estimate of cache line age (that is time since the cache line was last accessed), and due to the doubling of the division frequencies (for example) a large age range can be spanned. In more detail, cache lines with age bits 000 are estimated to be most recent, followed by cache lines with age bits 100, followed by cache lines with age bits x10, followed by cache lines with age bits xx1 (where "x" indicates either 0 or 1), of which the latter are estimated to be the least recent. Line age in the embodiments of the invention can be described, interchangeably and respectively, in terms of "older" or "newer", "least recently used" or "most recently use", "least recently accessed" or "most recently accessed", or similar terms. Line age may also be described, interchangeably and respectively, in more precise terms such as "estimated to be least recently used" or "estimated to be the most recently used", "estimated to be the least recently accessed" or "estimated to be the most recently accessed", etc.

In addition to establishing logical fields in the cache directory at process 100 of FIG. 1 and registering cache line ages at process 102 of FIG. 1, during the initialization process each memory address (e.g., of a main memory of the computer system) is mapped to a first set (i.e., a primary) and at least one second set (i.e., at least one overflow set) at process 104 of FIG. 1. This mapping can be implemented using a variety of techniques. For example, referring to FIGS. 4 and 5 in combination, each memory address can be mapped to a primary set using prior art mapping methods and then also mapped to an overflow set within the set-associative memory as a function of the primary set number (e.g., the overflow set number O(s) can be equal to (S+nsets/2+offset) MOD nsets, where S is the primary set number, nsets is the total number of sets, and the offset is a predetermined constant value). Alternatively, the memory address can be mapped to the overflow set by applying a bit-inverting technique, where the set-associative memory comprises n-sets and each of the n-sets is addressed by n-bits, and where a notation (e.g., !x) is used to indicate inverting a value of a given bit (e.g., bit x) within given set.

Figure 4:
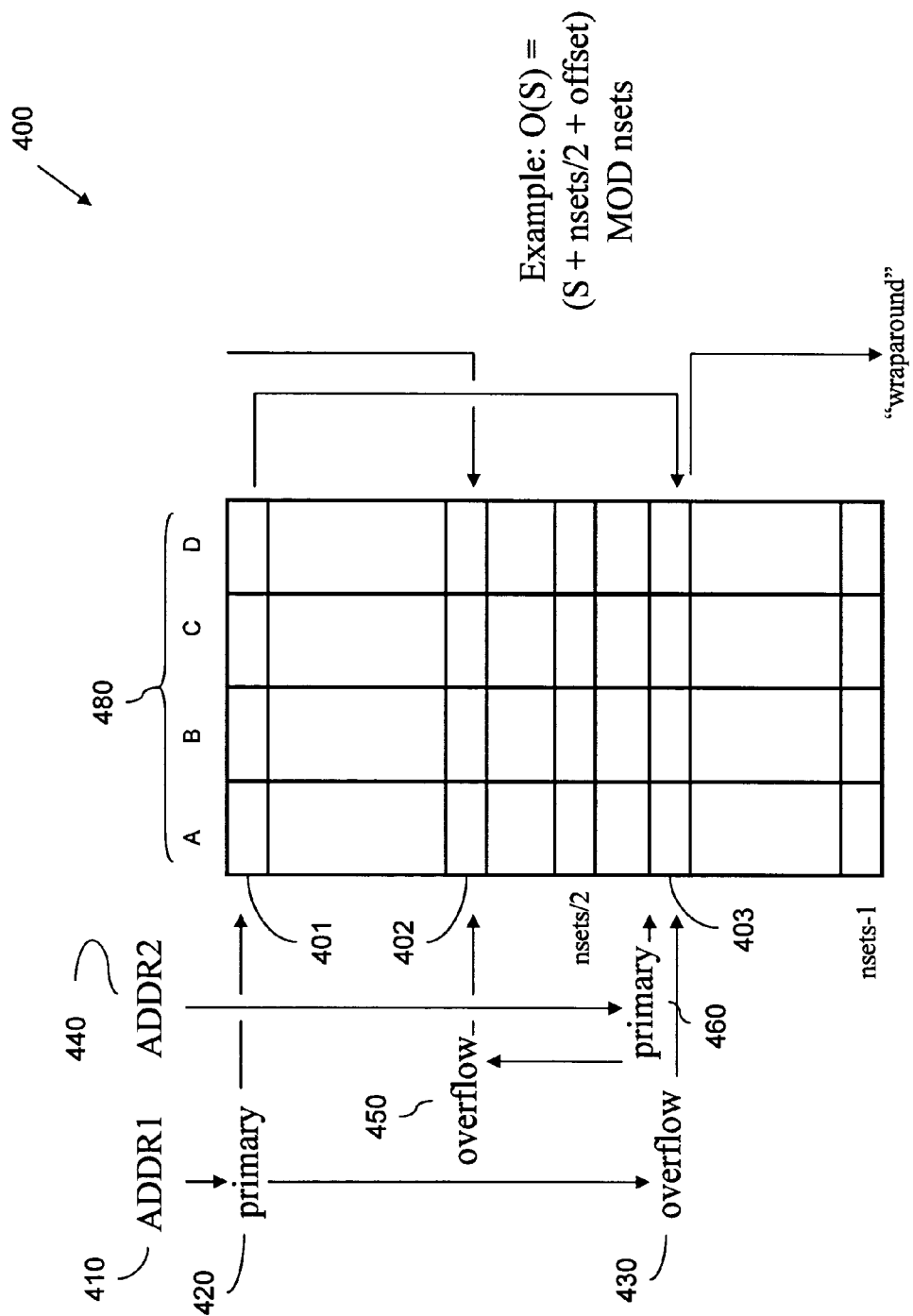
FIG. 4 is a schematic diagram illustrating an exemplary technique for accomplishing process 102 of FIG. 1.

More particularly, FIG. 4 illustrates an exemplary 4-way set-associative cache 400 and, specifically, how each memory address (e.g., ADDR1 410, ADDR2 440, etc.) is mapped into two sets, a first set (i.e., a primary set) and a second set (i.e., an overflow set), within the cache 400. For example, a first memory address 410 is mapped to a primary set 420 at set number 401 and to an overflow set 430 at set number 403. Similarly, a second memory address 440 is mapped to its primary set 460 at set number 403 and to its overflow set 450 at set number 402. The mapping of a memory address to its primary set (e.g., 420 or 460) may take place using mechanisms as in a conventional set-associative cache (e.g., by using a subset of the address bits or by using a hardware-computed hash value determined by the address bits) in order to determine the set number (e.g., set numbers 401 or 403). The remaining address bits (excluding the low order bits as determined by the cache line size) are referred to as the tag of the line and serve to uniquely identify a cache line (e.g., cache lines 480A-D) within a set (e.g., sets 401, 402, 403, etc.). As mentioned above, each first/primary set 420, 460 is associated with a second/overflow set 430, 450. As compared to a conventional set-associative cache, sufficient tag bits are required in order to determine whether a cache line is stored in its first (primary) set or in its second (overflow) set (e.g., see FIG. 2 and related discussion above regarding logical fields for cache directory).

FIG. 4 further illustrates an exemplary technique of associating second sets (i.e., overflow sets) with first sets (i.e., primary sets) for each memory address. Specifically, each overflow set 430, 450 is determined by the formula (S+nsets/2+offset) MOD nsets, where O(S) is a the set number of the overflow set, S is the set number of the primary set, nsets is the total number of sets and the offset is a predetermined constant. Thus, a first memory address (e.g., ADDR1 410) maps to its primary set 420 which is set number 401 and using formula O(S)=(S+nsets/2+offset), the first memory address 410 also maps to its overflow set 430 which is set number 403. Similarly, a second memory address (e.g., ADDR2 440) maps to its primary set 460 which is set number 403 and using the above-mentioned formula second memory address 440 also maps to its overflow set 450 which is set number 402. It should be noted that a primary set for one memory address may be mapped to the overflow set for another memory address (e.g., see set number 403 which serves as both the primary set 460 for the second address 440 and the overflow set 430 for the first address 410).

Figure 5:
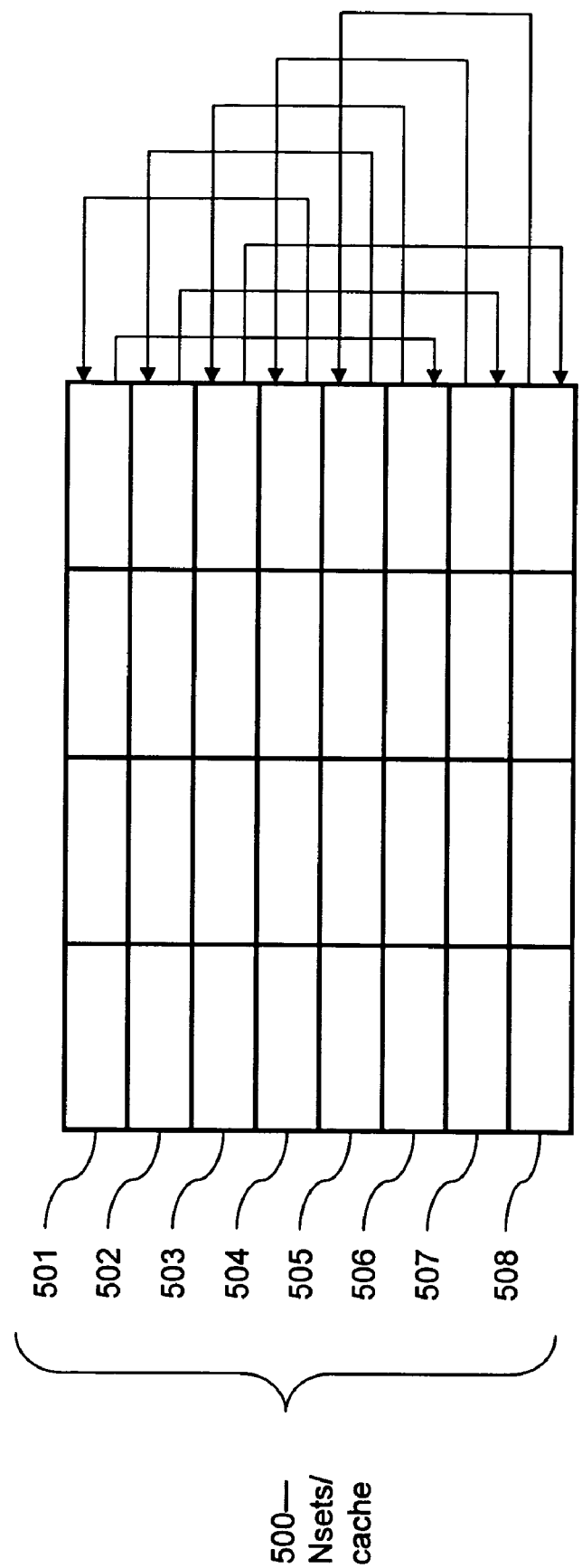
FIG. 5 is a schematic diagram illustrating an exemplary technique for accomplishing process 104 of FIG. 1; and, FIG. 6 is a continuation of the schematic flow diagram of FIG. 1.

FIG. 5 illustrates an exemplary mapping technique with a very small four-way cache 500 with eight sets 501-508. It should be noted that the small size is chosen for illustration purposes only and it is contemplated that this technique may be used for set-associative caches with an infinite number of sets. Thus, nsets is equal to 8 and the offset can be a predetermined value (e.g., offset=1), so that O(S)=(S+5) MOD 8. Therefore, the first set (i.e., the primary set) 501 maps to the second set (i.e., the overflow set) 505; the primary set 502 maps to overflow set 506; the primary set 503 maps to the overflow set 507; and so on with primary set 508 mapping to overflow set 505. If the primary to overflow set mapping formula (i.e., O(S) equals (S+nsets/2+offset) MOD nsets), discussed above, is implemented, the complexity of this mapping is not an implementation issue since the overflow sets are found from cache directory entries OTI 230 and OFI 240 (see FIG. 2).

Figure 2:
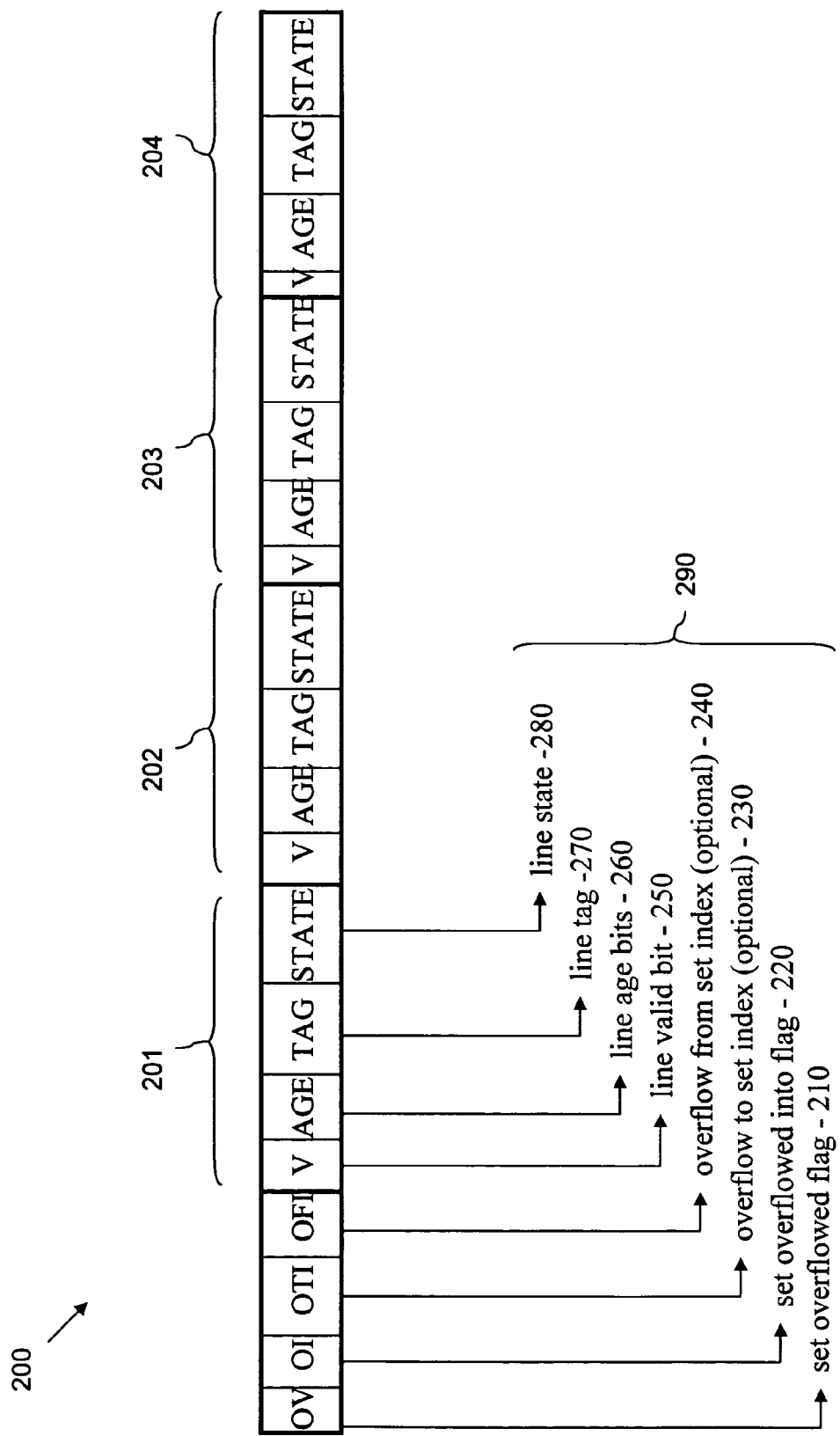
FIGS. 2-3 are schematic diagrams illustrating an exemplar technique for accomplishing process 100 of FIG. 1.

Conversely, if the OTI 230 and OFI 240 entries are not used in the cache directory, as illustrated in FIG. 2, a simpler mapping technique such as a bit-flipping technique may be used to reduce the hardware requirements. For example, assume (for the purpose of this example) that there are 256 sets, so that a set number can be represented with 8 bits s0 s1 s2 s3 s4 s5 s6 s7. In this example s0 and s1 determine which of the remaining bits to flip, as follows, where the notation !x is used to indicate flipping (inverting) the value of bit x:

0 0 s2 s3 s4 s5 s6 s7 maps to 1 0 s2 s3 s4 s5 s6 !s7;
0 1 s2 s3 s4 s5 s6 s7 maps to 1 1 s2 s3 s4 s5 !s6 s7;
1 0 s2 s3 s4 s5 s6 s7 maps to 0 1 s2 s3 s4 !s5 s6 s7; and
1 1 s2 s3 s4 s5 s6 s7 maps to 0 0 s2 s3 !s4 s5 s6 s7.

The cycle length of this mapping is 8, it has a very low cost hardware implementation, and it is expected that cache reference patterns would be uncorrelated with primary and overflow set pairings as given by this mapping. The preceding has been given only as an example to illustrate alternative hardware implementations for primary to overflow set mappings.

Additionally, it is contemplated that embodiments of the method of the invention may incorporate the use of more than one overflow set. While designs using multiple overflow sets are possible, those skilled in the art will recognize that in practice the number of overflow sets should be small for implementation and performance reasons. Assuming the primary set to overflow set mapping has a large cycle length (i.e., the number of times the mapping when successively applied returns to the primary set, which could range from two for paired sets up to the number of sets in the cache as shown in FIG. 5, for example), successive overflow sets could be generated by applying this mapping repeatedly to the primary set and then, to successive overflow sets. In the case that secondary and tertiary overflow sets are allowed, the overflow state of the primary set could be represented for example as follows: (a) 00—no overflow lines in either secondary or tertiary overflow set; (b) 10—one or more overflow lines in secondary overflow set only; (c) 01—one or more overflow lines in tertiary overflow set only; (d) 11—one or more overflow lines in both the secondary and tertiary overflow sets.

Once the initialization process is complete (i.e., once the logical fields are established at process 100 of FIG. 1 and the memory addresses are mapped at process 104 of FIG. 1), then if conflict misses occur in a first set (i.e., a primary set) at process 106 of FIG. 1, the line replaced as a result of the conflict miss can be relocated to the mapped second set (i.e., the mapped overflow set) as opposed to being lost (i.e., removed from the set-associative cache). Specifically, if data is input into a set and a conflict miss occurs at process 106, then a cache line (i.e., selected cache line) within the set is selected for replacement at process 110 of FIG. 1, based on predetermined replacement policies. These predetermined replacement policies can include, but are not limited to, selecting the least recently used (LRU) line based upon a comparison of the age bits of each line within the set.

Specifically, once a conflict miss occurs, a determination can be made as to whether the selected cache line is an original line (i.e., received directly from another memory within the computer) or an overflow line (i.e., a line that was relocated to the first set from another set within the set-associative cache) (120). If the selected cache line is an original line and/or if multiple overflow sets are mapped, the selected cache line can be forwarded to the appropriate second set (i.e., the appropriate overflow set (125). Then, the age bits of the selected cache line from the primary set can be compared to the age bits of each line in the overflow set and a determination can also be made as to which of the cache lines from the overflow set was least recently accessed (150). If the selected cache line from the primary set (or the previous overflow set) is estimated to be newer (e.g., estimated to be more recently accessed) than any one of the cache lines in the overflow set, then the selected cache line will replace the oldest (e.g., estimated to be least recently accessed) cache line of the overflow set (160). Additionally, once such an overflow replacement has occurred, the overflow set will be flagged (e.g, with a second-type OI flag) to indicate that it contains a cache line received as an overflow line from another set. Additionally, the primary set (or the previous overflow set if multiple overflow sets are mapped) will be flagged (e.g., with a first-type OV flag) to indicate that a cache line was previously relocated. However, if the selected cache line is already an overflow line, and only one second set (i.e., only one overflow set) was mapped, a determination will be made as to whether the primary set currently contains any other overflow lines and, if not, a second-type (OI) flag will be cleared from the first set.

Figure 6:
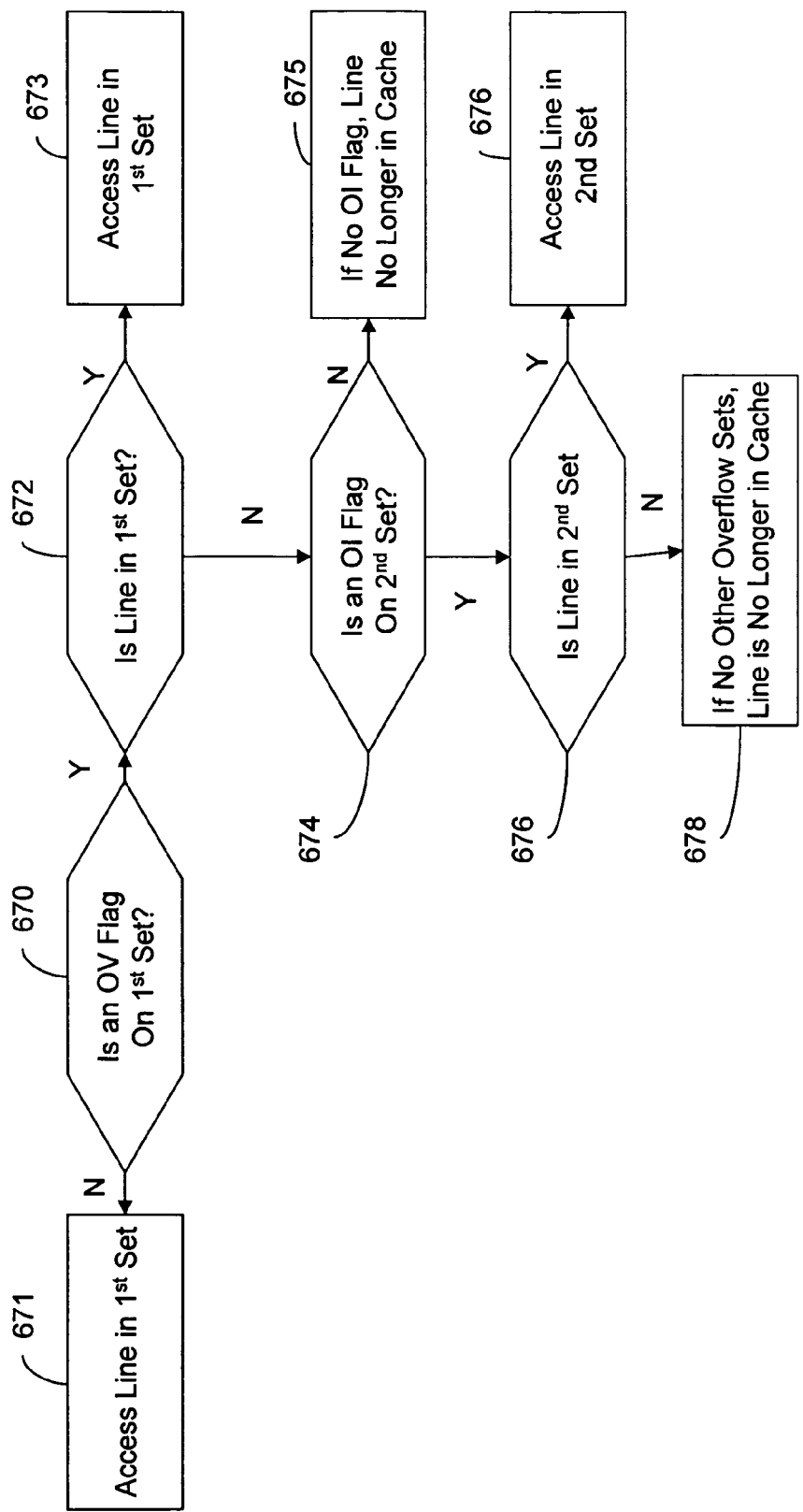

Referring to the flow diagram of FIG. 6, because a given cache line may be located in the first set (i.e., the primary set) or the second set (i.e., the overflow set) or may have been removed from the cache all together, in order to access a particular cache line (e.g., the selected cache line) from the set-associative memory as efficiently as possible, an initial determination should be made as to whether the primary set is flagged with a first-type OV flag to indicate that at least one of the cache line in the set has been relocated from the primary set to an overflow set at process 670. If there is no first-type flag, then the cache directory is simply accessed as in a conventional cache to locate the selected cache line within the primary set at process 671. If the primary set (or one of multiple overflow sets) is flagged with a first-type OV flag, then the cache directory is accessed to determine if the selected cache line is still located in the primary set (e.g., if the selected cache line or a different cache line was previously relocated) at process 672. If the selected cache line is not located in the primary set, a determination is made as to whether the overflow set is still flagged with a second-type O1 flag indicating that it contains a line that was relocated to the overflow set from a primary set (or from previous overflow set) at process 674. If the overflow set does not have a second-type OI type flag, then the selected line is no longer located in the cache (675). If the overflow set has a second-type O1 flag, the cache directory is accessed to determine if the selected cache line is still located in the overflow set at process 676. If so, the selected line may be accessed from the overflow set (676) and if not and no other overflow sets are mapped, then the line is no longer located in the cache (678).

Those skilled in the art will recognize that various hardware configurations may be used to implement the method. For example, once it is determined at process 670 that an OV flag is present on the first set (i.e., the primary set), process 162-678 may be accomplished in a step-by-step fashion in which the cache directory is accessed a first time to determine if the line is in the primary set (672) and a second time, if necessary, to determine if the line is in the second set (i.e., an overflow set) (676).

Alternatively, if the primary set is flagged, the cache directory can be accessed once and a determination can be made simultaneously as to whether the selected cache line is located in either the first directory (672) or the second directory (676). This technique takes into consideration that for the step-by-step cache access process there is a small performance penalty when a cache line is found in the overflow set because two cache directory accesses are required. Therefore, assuming there is logic available to fetch and compare 2K tags and perform all tag compares in parallel (where K is the associativity), given the appropriate cache directory design, both the primary set and overflow set could be examined in parallel if the overflow flag for the primary set is on. Similarly, for secondary, tertiary, etc. overflow sets, the overflow state of the primary set would indicate which sets to examine either sequentially or in parallel, or by some combination of sequential/parallel. Here, as compared to a conventional cache design with an associativity of 2K for example, there should be significant savings in power since it is expected that in many cases the overflow flag will be off; there may also be improved performance due to the avoidance of "hot" sets and a resulting increase in the cache hit ratio.

Therefore, disclosed above, are embodiments of a method for reducing conflict misses in a set-associative cache by mapping each memory address to a primary set and at least one overflow set within the cache. If a conflict miss occurs within the primary set, a cache line from the primary set is selected for replacement. However, rather than removing the selected cache line from the cache completely, the selected cache line may instead be relocated to the overflow set mapped for the particular memory address. The selected cache line replaces a cache line in the overflow set, if it is determined that the selected cache line from the primary set has an estimated age that is more recent than an estimated age for any cache line in the overflow set. Embodiments of the method incorporate various techniques for estimating the age of cache lines, and, particularly, for estimating the relative time since any given cache line was last accessed. These embodiments of the method of the invention, as described above, reduce conflict misses in a set-associative cache without increasing the associativity of the cache, without increasing the number of entries in the cache directory, and without introducing levels of indirection between the cache directory and the cache. While the invention has been described in terms of embodiments, those skilled in the art will recognize that the invention can be practiced with modification within the spirit and scope of the appended claims.

What is claimed is:

1. A method for use in a computer system with a set-associative cache memory, said method comprising:
    mapping a memory address to both a first set and a second set within said set-associative cache memory;
    replacing a selected cache line of said first set with another cache line;
    registering estimated ages of each cache line in said set-associative cache memory; and
    relocating said selected cache line to said second set if said selected cache line is estimated to be more recently accessed than any cache lines in said second set.

2. The method according to claim 1, wherein said memory address is mapped to a second set number for said second set within said set-associative cache memory as a function of a first set number of said first set.

3. The method according to claim 1, wherein said memory address is mapped to a second set number of said second set by applying a bit-inverting technique,
    wherein said set-associative cache memory comprises n-sets and each of said n-sets is addressed by n-bits, and
    wherein a notation is used to indicate inverting a value of a given bit for a given set.

4. The method according to claim 1, further comprising:
    flagging said second set to indicate that said second set contains a cache line received from another set; and
    flagging said first set to indicate that a cache line was relocated from said first set to another set.

5. The method according to claim 1, further comprising accessing said selected cache line by determining if said first set is flagged to indicate that a cache line has been relocated from said first set to another set.

6. The method according to claim 5, wherein if said first set is flagged, then said method further comprises:
    determining if said selected cache line is located in said first set;
    if said selected cache line is not located in said first set, determining if said second set is still flagged indicating that a cache line has been relocated to said second set; and
    if said second set is still flagged, determining if said selected cache line is located in said second set.

7. The method according to claim 1, further comprising:
    determining if said selected cache line was received directly to said first set from another memory within said computer system and not previously relocated to said first set from another set within said set-associative cache memory; and
    only relocating said selected cache line if said selected cache line was received directly to said first set from another memory.

8. A method for use in a computer system with a set-associative cache memory, said method comprising:
    mapping a memory address to both a first set and a second set within said set-associative cache memory;
    replacing a selected cache line of said first set with another cache line;
    associating a decay counter with each cache line in said set-associative cache memory to register an estimated age of each of said cache lines; and
    relocating said selected cache line to said second set if said selected cache line is estimated to be more recently accessed than any cache lines in said second set.

9. The method according to claim 8, wherein said memory address is mapped to a second set number for said second set within said set-associative cache memory as a function of a first set number of said first set.

10. The method according to claim 8, wherein said memory address is mapped to a second set number for said second set by applying a bit-inverting technique,
    wherein said set-associative cache memory comprises n-sets and each of said n-sets is addressed by n-bits, and
    wherein a notation is used to indicate inverting a value of a given bit for a given set.

11. The method according to claim 8, further comprising:
    flagging said second set to indicate that said second set contains a cache line received from another set; and
    flagging said first set to indicate that a cache line was relocated from said first set to another set.

12. The method according to claim 8, further comprising accessing said selected cache line by determining if said first set is flagged to indicate that a cache line has been relocated from said first set to another set.

13. The method according to claim 12, wherein if said first set is flagged, then said method further comprises:
    determining if said selected cache line is located in said first set;
    if said selected cache line is not located in said first set, determining if said second set is still flagged indicating that a cache line has been relocated to said second set; and
    if said second set is still flagged, determining if said selected cache line is located in said second set.

14. The method according to claim 8, further comprising:
    determining if said selected cache line was received directly to said first set from another memory within said computer system and not previously relocated to said first set from another set within said set-associative cache memory; and
    only relocating said selected cache if said selected cache line was received directly to said first set from another memory.

15. A method for use in a computer system with a set-associative cache memory, said method comprising:
    mapping a memory address to both a first set and a second set within said set-associative cache memory;
    replacing a selected cache line of said first set with another cache line;
    associating multiple age bits with each cache line in said set-associative cache memory;
    incrementing said multiple age bits to register an estimated age of each of said cache lines; and relocating said selected cache line to said second set if said selected cache line is estimated to be more recently accessed than any cache lines in said second set.

16. The method according to claim 15, wherein said incrementing of said multiple age bits comprises:

associating each of said multiple age bits with a corresponding counter in communication with a clock signal; and incrementing each of said multiple age bits at different rates based upon communications to said corresponding counters from said clock signal.

17. The method according to claim 15, wherein said incrementing of each of said multiple age bits at different rates comprises:

setting each of said multiple age bits for a given cache line to "0" when said given cache line is accessed; and dividing a frequency of a clock signal by successively greater amounts so that clock signals communicated to each of said corresponding counters are received by said corresponding counters at different rates.

18. The method according to claim 15, wherein said memory address is mapped to a second set number for said second set within said set-associative cache memory as a function of a first set number of said first set.

19. The method according to claim 15, wherein said memory address is mapped to a second set number for said second set by applying a bit-inverting technique, wherein said set-associative cache memory comprises n-sets and each of said n-sets is addressed by n-bits, and wherein a notation is used to indicate inverting a value of a given bit within given set.

20. The method according to claim 15, further comprising:

flagging said second set to indicate that said second set contains a cache line received from another set; and flagging said first set to indicate that a cache line was relocated from said first set to another set.

* * * * *